(12) United States Patent
Kern et al.

(10) Patent No.: US 11,493,607 B2
(45) Date of Patent: Nov. 8, 2022

(54) DEVICE FOR RECEIVING LIGHT FOR THE DETECTION OF AN OBJECT

(71) Applicant: Robert Bosch GmbH, Stuttgart (DE)

(72) Inventors: Oliver Kern, Renningen (DE); Jan Niklas Caspers, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 677 days.

(21) Appl. No.: 16/551,389

(22) Filed: Aug. 26, 2019

(65) Prior Publication Data
US 2020/0072952 A1 Mar. 5, 2020

(30) Foreign Application Priority Data

Aug. 29, 2018 (DE) .......................... 102018214586.5

(51) Int. Cl.
*G01S 17/42* (2006.01)
*G01S 7/481* (2006.01)
*G01S 7/4912* (2020.01)
*G02B 27/00* (2006.01)

(52) U.S. Cl.
CPC .......... *G01S 7/4817* (2013.01); *G01S 7/4912* (2013.01); *G02B 27/0087* (2013.01)

(58) Field of Classification Search
CPC .. G01S 7/4817; G01S 7/4912; G02B 27/0087
USPC .......................................................... 356/5.01
See application file for complete search history.

(56) References Cited

U.S. PATENT DOCUMENTS

| | | | |
|---|---|---|---|
| 10,048,366 B1 | 8/2018 | Hong et al. | |
| 2018/0231637 A1 | 8/2018 | Thompson et al. | |
| 2019/0339389 A1* | 11/2019 | Russo | ...................... G01S 7/282 |

FOREIGN PATENT DOCUMENTS

DE 102006039104 A1 1/2008

\* cited by examiner

*Primary Examiner* — Nguyen T Truong
(74) *Attorney, Agent, or Firm* — Norton Rose Fulbright US LLP; Gerard Messina

(57) ABSTRACT

A device for receiving light having at least one wavelength for the detection of an object, includes: an optical phased array including a plurality of optical phased sub-arrays, each optical phased sub-array including (a) a plurality of antennas and (b) a detector for coherently receiving light; and an evaluation unit connected to the optical phased sub-arrays and configured to determine the angle at which the object is detected.

11 Claims, 5 Drawing Sheets

DEVICE FOR RECEIVING LIGHT FOR THE DETECTION OF AN OBJECT

CROSS-REFERENCE TO RELATED APPLICATIONS

The present application claims priority under 35 U.S.C. § 119 to DE 10 2018 214 586.5 filed in the Federal Republic of Germany on Aug. 29, 2018, the content of which is hereby incorporated by reference herein in its entirety.

FIELD OF THE INVENTION

The present invention relates to a device for receiving light having at least one wavelength for the detection of an object, including an optical phased array. The present invention furthermore relates to a method for detecting an object using light having at least one wavelength using an optical phased array. The present invention furthermore relates to a LIDAR system.

BACKGROUND

A phased array is essentially a phase-controlled antenna array having strong directionality, which achieves a bundling of electromagnetic radiation energy through the arrangement and interconnection of individual radiators/emitters. If it is possible to activate the individual radiators/emitters differently, the radiation pattern of the antenna array is electronically pivotable so that mechanically movable parts can be dispensed with for this.

Beamforming in the far field is carried out in phased arrays by a constructive and destructive superposition of the electromagnetic waves emitted by the individual emitters, elements (antennas/emitters) usually arranged periodically in the array. Given by the distances of the individual emitters in the array and the wavelength used, one or more positions result in the far field, in which the partial waves of the individual emitters constructively interfere and generate a spot or optical beam. These points/directions are also referred to as the main lobe and, if necessary, side lobes. By setting the phase of the individual partial waves, it is possible to influence the position and/or direction in which the constructive superposition takes place. In this way, the lobe can be moved over an angular range, for example. Furthermore, by establishing the individual phases, it is possible to generate an almost arbitrary intensity profile in the far field. With phased arrays, a portion of the output is irradiated into the background and not into the main beam, i.e., in the scanning or detection direction.

SUMMARY

In an example embodiment, the present invention provides a device for receiving light having at least one wavelength for the detection of an object, the device including an optical phased array including a plurality of optical phased sub-arrays that each includes (a) a plurality of antennas and (b) a detector for coherently receiving light; and an evaluation unit, which is connected to the optical phased sub-arrays and designed to determine the angle at which the object is detected.

In an example embodiment, the present invention provides a method for detecting an object using light having at least one wavelength, including the steps of: emitting light having at least one wavelength at a particular angle; receiving light using an optical phased array including a plurality of optical phased sub-arrays, each optical phased sub-array including a plurality of antennas and a detector for coherently receiving light; determining at least one possible object based on the received light; and verifying an object based on the angle at which the possible object is detected.

In an example embodiment, the present invention provides a LIDAR system including the noted device.

In other words, in particular, the reception area of the optical phased array is divided into a plurality of optical phased sub-arrays. Each of these optical phased sub-arrays includes a detector and carries out the coherent reception, including signal processing, which results in a complex spectrum for each detector. The frequency at which, in the magnitude spectrum of the complex spectrum, the maximum of this magnitude spectrum occurs is the sought-after frequency. Due to the different central positions of the optical phased sub-arrays, the complex amplitude of these frequencies is different. From the relative phase difference between frequencies of the individual optical phased sub-arrays, it is possible to infer the angle from which the light is returned by the object to the optical phased array, i.e., the angle at which a detected possible object is situated. In particular, this corresponds to the angle in which the main lobe of the beamforming of the optical phased array points, which can be checked accordingly. However, if this is not the case, a "ghost target," i.e., a detected, but not actually present object, is involved, which can be identified as such and accordingly ignored.

One of the advantages achieved thereby is that the number of false positive targets is thus considerably reduced. False positive targets are points that are identified as an object and output in a point cloud, but that in reality do not exist, at least not in this location. In particular, this is a list of detected targets, including, for example, angle, distance, reflection intensity, etc. For visualization, these targets or detections can be represented as a point in a three-dimensional image of the surroundings. The accumulation of points is cloud-shaped, for example, i.e., these form a point cloud. A LIDAR system thus, for example, processes as though it sees an object, but no object is, in fact, situated there.

Further features, advantages, and further example embodiments of the present invention are described hereafter or become apparent thereby.

According to an example embodiment, at least one, preferably at least two, of the central positions of optical phased sub-arrays is/are situated asymmetrically in the respective optical phased sub-array. The advantage of this is that the different central positions enable a reliable detection of false positive objects or targets. In the present application, the term "central position" means the phase center of combined light entry points, in particular the geometric center of an optical phased sub-array in the direction in which the individual light exit points are combined.

According to an example embodiment, the evaluation unit includes at least one analog-to-digital converter and a processor. In this way, an easy and reliable evaluation and an easy implementation are possible.

According to an example embodiment of the method, to determine the at least one possible object, a frequency is ascertained at a maximum of the magnitude of the recorded spectrum of the received light, averaged across the optical phased sub-arrays. In other words, a spectrum is formed for each of the sampled signals. This spectrum is, in particular, complex, the maximum is then sought in the magnitude of this spectrum, and the associated frequency is ascertained.

Instead of carrying out separate maxima searches, the magnitude spectra are averaged. The advantage of this is that the signal-to-noise ratio can then be enhanced through non-coherent integration.

According to an example embodiment, to verify the possible object as an object, it is checked whether a maximum of an angular spectrum exists at the particular angle. In this way, it is possible to check in a simple and simultaneously reliable manner whether or not a possible object is a real object.

According to an example embodiment, to provide an angular spectrum, the amplitudes in the frequency spectrum are measured by each optical phased sub-array at the ascertained frequency and linked, in particular multiplied, with values measured in advance. In this way, an angular spectrum can be provided in a simple manner.

According to an example embodiment, if the verification of the possible object as an object is not successful, a frequency is determined at a further maximum of the recorded spectrum of the received light, averaged across the optical phased sub-arrays. In this way, it is possible to successively check further maxima as to whether or not these can be assigned to a real object.

According to an example embodiment of the LIDAR system, this system is designed to be operated based on the frequency-modulated continuous wave (FMCW) principle. Using the FMCW principle, it is possible to calculate the distance of an object via differences in the transmission frequency and reception frequency ramps.

Further important features and advantages of the present invention are derived from the claims, the figures, and the associated description of the figures.

The above-mentioned features and those described hereafter can be used not only in the particular described combination, but also in other combinations, or alone, without departing from the scope of the present invention.

Example embodiments of the present invention are shown in the drawings and are described in greater detail in the following description, identical reference numerals referring to identical or similar or functionally equivalent components or elements.

DETAILED DESCRIPTION

Figure 1:
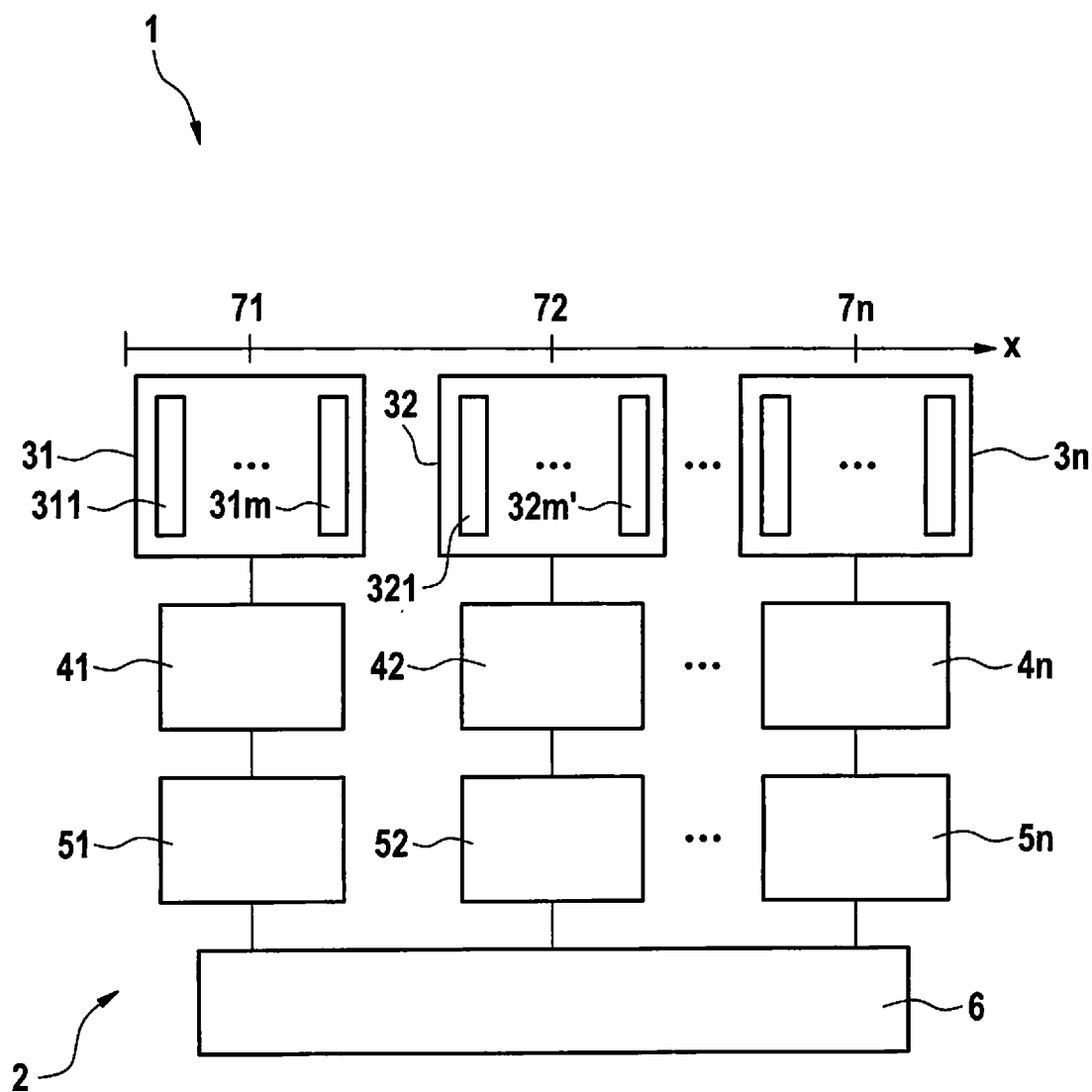
FIG. 1 shows a device according to an example embodiment of the present invention.

FIG. 1 shows a device 1 according to an example embodiment of the present invention in schematic form. Device 1 includes an optical phased array 2, which, in general, includes a total of n optical phased sub-arrays 31, 32, ..., 3n. Each phased sub-array 31, 32, ..., 3n has a corresponding central position 71, 72, ..., 7n. Each optical phased sub-array 31, 32, ..., 3n overall includes a plurality of antennas 311, 312, ..., 31m; 321, 322, ..., 32m'; and so forth. Each of the optical phased sub-arrays 31, 32, ... 3n is connected to a photodiode 41, 42, ..., 4n, which in turn is connected to a respective analog-to-digital converter 51, 52, ..., 5n. All analog-to-digital converters 51, 52, ..., 5n are connected to a shared digital signal processor 6 for evaluation.

Figure 2:
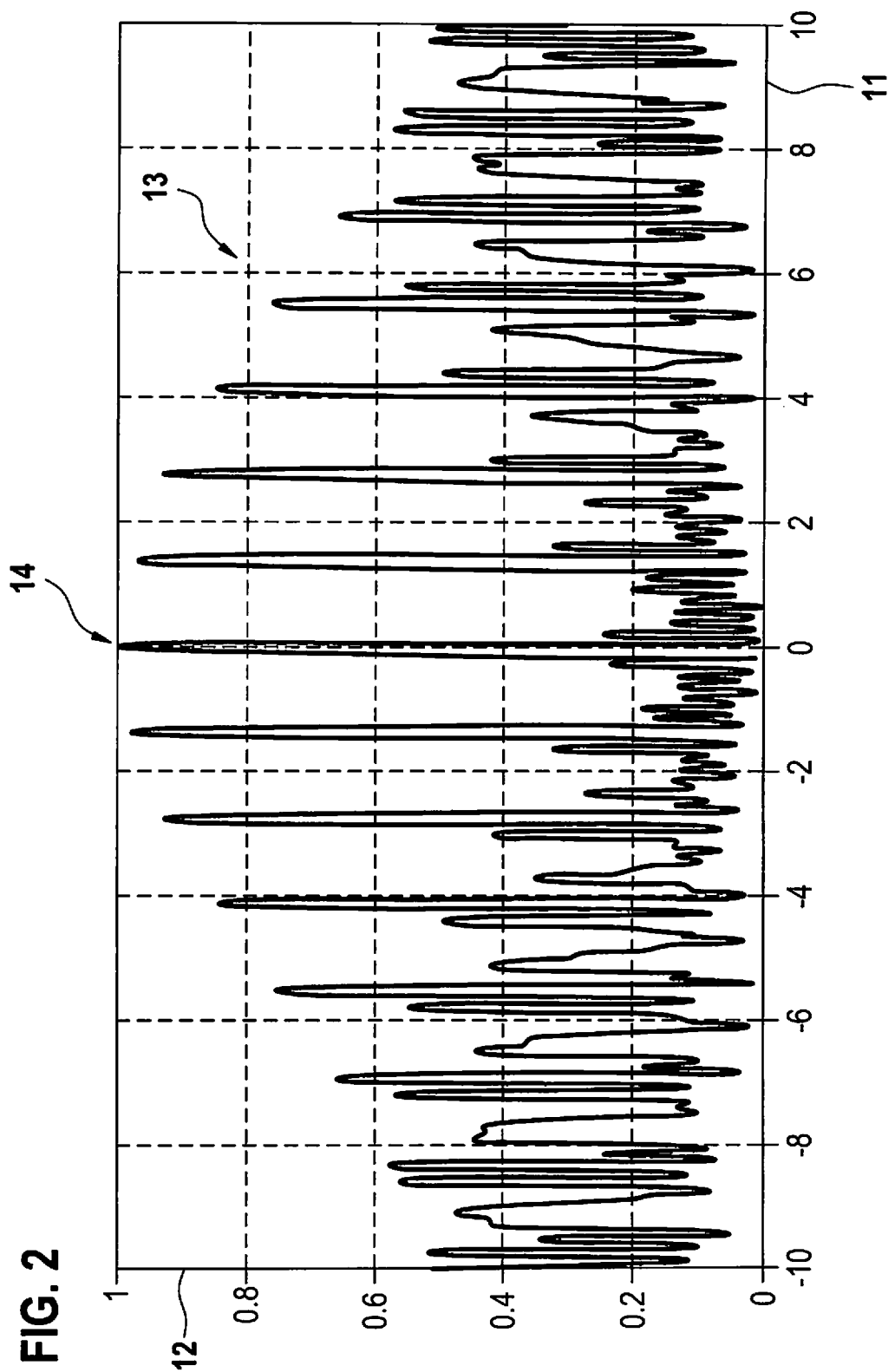
FIG. 2 shows an angular spectrum recorded using a device according to an example embodiment of the present invention.

FIG. 2 shows an angular spectrum recorded using a device according to an example embodiment of the present invention. In detail, FIG. 2 shows an angular spectrum 13 for n=8 non-equidistantly situated optical phased sub-arrays 31, ..., 38 of FIG. 1. The respective measured intensity 12 is plotted against angle 11 here. Spectrum 13 shown in FIG. 2 has a single maximum 14 only for the actual angle at 0°.

Figure 3:
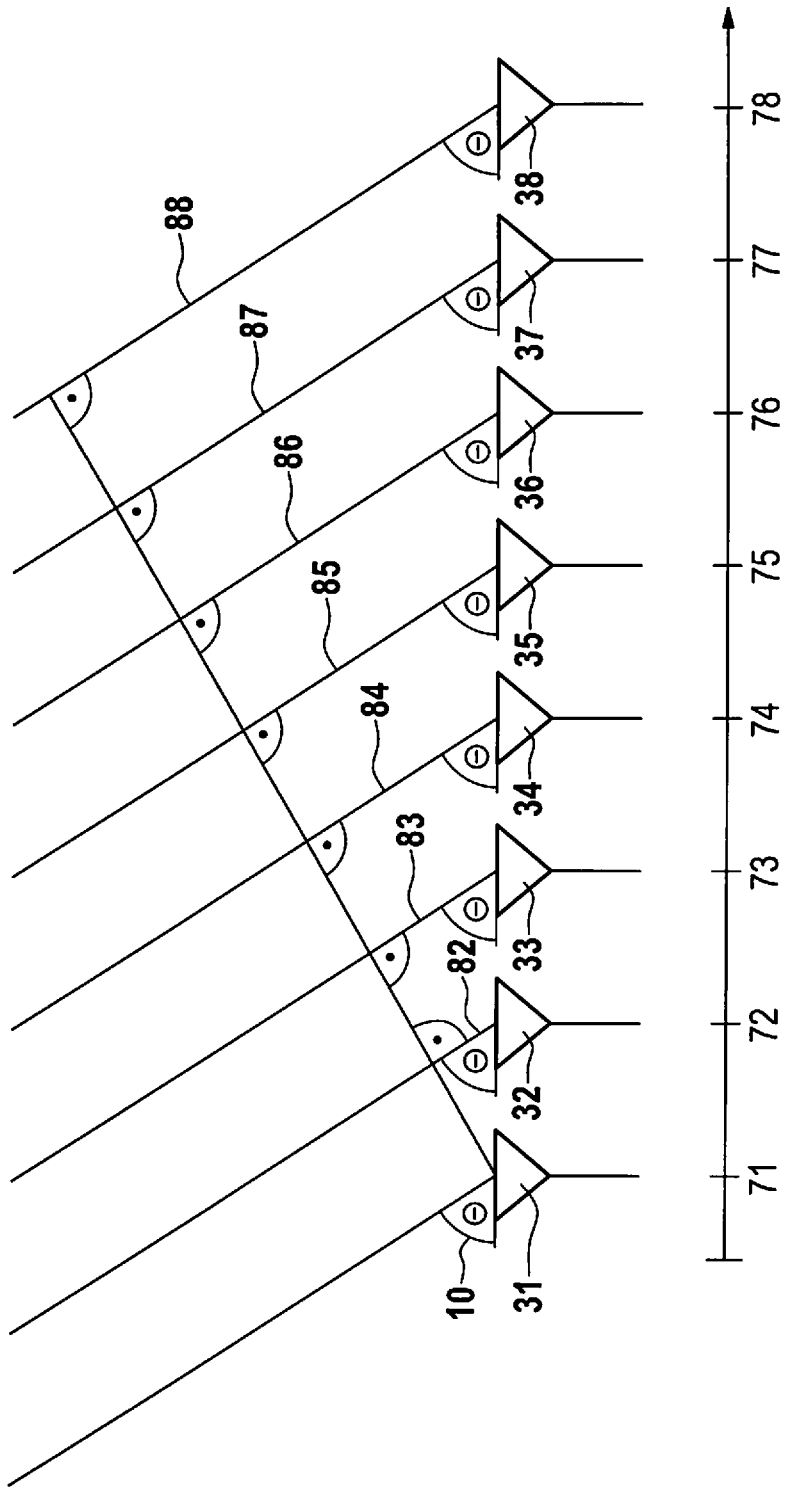
FIG. 3 shows a portion of a device according to an example embodiment of the present invention.

FIG. 3 shows a portion of a device according to an example embodiment of the present invention. In detail, FIG. 3 shows eight optical phased sub-arrays 31, ..., 38. These receive corresponding light at an angle 10. Propagation time differences, based on which a corresponding phase change can be ascertained in the received light, or more precisely in the complex amplitude of the peaks in the respective spectra, can arise as a result of different wavelengths 82, 83, ..., 88 due to the different positions of optical phased sub-arrays 31, ..., 38. Based thereon, angle 10 is then estimated, as is described below.

Device 1 is described hereafter by way of example based on a phased array 2 including 128 channels, divided into eight optical phased sub-arrays 31, 32, ..., 38, each including 16 channels. However, a different number of channels and/or number of optical phased sub-arrays is also possible. Each of these optical phased sub-arrays 31, 32, ..., 38 is, in particular, a full-fledged FMCW LIDAR sensor, i.e., includes a local oscillator whose optical signal is superimposed with the received optical signal and thereby interferes therewith on photodiode 41, 42, ..., 48. The local oscillator refers, in particular, to light of a portion of the light output, which is branched off prior to the emission of modulated laser light, for example using a splitter. This portion of the light is then superimposed again with the received light, resulting in interference between the two. The combination of the two portions can then be detected by a photodiode. In the photocurrent of the photodiode, a beat signal, comparable to the baseband signal in a FMCW radar, can be measured.

Furthermore, there are consequently eight parallel paths, the signals of the paths being sampled separately using the respective analog-to-digital converter 41, ..., 48, and it being possible to process them in a shared digital signal processing unit 6. In principle, initially separate DSP units 6 are also possible. For the sake of clarity, representation of the superposition with the local oscillator for the implementation of the FMCW principle is dispensed with in FIG. 1. In fact, not only the received light, but also the superposition of received light with the light from a local oscillator, are measured on photodiode 41, 42, ..., 48.

A spectrum is formed for each of the sampled signals. This spectrum is, in particular, complex, and the maximum is then sought in the magnitude of this spectrum. Instead of carrying out separate maxima searches, the magnitude spectra are averaged to enhance the signal-to-noise ratio through non-coherent integration. If the frequency of the maximum was found in the magnitude spectrum, the complex amplitude is again extracted at this location in the complex spectra of the eight photodiode signals and stored. Thus, a vector having eight complex values is obtained. These values correspond to the complex amplitude at the location of the respective maximum in the magnitude spectra of the signals of photodiodes 41, 42, ..., 48. These complex amplitudes include information about the angle at which the light was received since propagation time differences between optical phased sub-arrays 31, . . . , 38 can arise due to different central positions 71, . . . , 78 of optical phased sub-arrays 31, . . . , 38. These propagation time differences correspond to a phase difference of the respective signals, as shown in FIG. 3. For example, the phase difference between the detected peak, the associated light being situated at an angle 10 with respect to device 1, of the far left optical phased sub-array 31 and optical phased sub-array 32 situated at distance px2−px1 next to it, corresponds to:

$$\Delta_\varphi = 2\pi \frac{p_{x2} - p_{x1}}{\lambda} \sin\theta$$

Since it is assumed that the distance from the possible object is large compared to the size of the device, it is assumed that angle θ 10 with respect to all optical phased sub-arrays 31, . . . , 38 is identical. This is referred to as far field approximation and can be considered to be given when the object distance is, in particular, 100 times greater than the size of device 1. As was stated, it is known from the beam deflection which one is presently illuminated angle 10. Phase data stored in advance exist for each angle 10. The stored data have the dimension of the number of elements multiplied with the number of possible angles. Through multiplication with the complex measuring data, i.e., the vector of the complex amplitudes of the detected possible objects, in particular a vector of the length of the angles to be examined is formed. The reference data are complex conjugated. The result in the case of two identical vectors is thus added up in-phase, and a maximum is obtained. The magnitude of the result of this multiplication, plotted across all angles, is referred to as angular spectrum 13, as shown in FIG. 2. This function is, in particular, divided by the number of measuring data, i.e., by eight here, to standardize the function in such a way that maximum 14 is at 1. In other words, the measuring data are multiplied with the reference data for each possible angle. Where these two vectors best agree, a maximum 14 results in angular spectrum 13. When this maximum 14 is at angle 11, which corresponds to presently illuminated angle 10, then the detected possible object is a real object. When no maximum 14 exists or maximum 14 occurs at a different angle, the detected possible object is a false positive object and is ignored. This method is shown in detail in the flowchart in FIG. 4.

Central positions 71, 72, . . . 78 of optical phased sub-arrays 31, 32, . . . , 38 are selected in such a way that, in particular, no or only minor ambiguities occur during the angle estimation. For example, an optical phased array 2 having the central positions of the optical phased sub-arrays [0 1 2 3 4 5 6 7]*16*4 μm=[0 16 32 48 64 80 96 112 128]*4 μm, at a target angle of 0° and a wavelength of 1550 nm, would result in an undifferentiated angular spectrum. The position vector shall be understood in such a way that individual antennas 311, . . . , 31$m$; 321, . . . , 32$m'$ are situated at a distance of 4 μm and that 16 at a time are combined to form an optical phased sub-array 31, . . . , 38. Central positions 71, 72, . . . , 78 of these optical phased sub-arrays 31, . . . , 38 are thus situated in locations 16*4 μm, 32*4 μm, etc.

By changing central positions 71, 72, . . . , 78 of individual optical phased sub-arrays 31, . . . , 38 to [0 1*16 16+15 3*16 3*16+17 5*16 6*16 7*16]*4 μm=[0 16 31 48 64 81 96 112 128]*4 μm, an angular spectrum 13 according to FIG. 2 is generated for the same angle and the same wavelength. This position vector almost corresponds to those above, except that optical phased sub-array 32 is shifted by one element (to the left), and optical phased sub-array 34 is shifted by one element (to the right). This irregularity causes the angular spectrum to include fewer ambiguities. The angle estimation for second optical phased sub-array system 32 is less ambiguous, and information as to whether or not the target is in fact situated at the illuminated angle 10 can be provided more easily. Minor ambiguities or almost maxima are not of great importance since it is only to be detected whether or not the object is in fact situated in the illuminated direction. By examining the complex amplitudes of a beat frequency, angle 10 from which the light was received can thus be calculated. This can be carried out using known direction of arrival estimation methods, or digital beamforming. In detail, thus a beat frequency is detected, for example. As a result of the optical phased sub-arrays, the number of complex spectra obtained corresponds to the number of optical phased sub-arrays present. The complex amplitudes of these beat frequencies are used as input data for the digital beamforming. For example, they are compared to and/or correlated with reference or calibration data recorded in advance. The digital beamforming yields an angular spectrum, from which it is possible to determine the direction from which the target or the detected object came.

A simple method is to measure, in advance, a target at a known distance for all possible angles, and to store the complex amplitudes of the beat frequencies in device 1. The stored data thus have the dimension of the number of optical phased sub-arrays 31, . . . , 38 multiplied with the number of examined angles. These are then multiplied with the measured data, and the angle of the data recorded in advance at which maximum 14 results corresponds to angle 10 from which the light was received. This detected angle can then be compared to angle 10, in which the main lobe of the beamforming of phased array 2 pointed. If these do not agree, the predefined object is not a real object and can be marked as such. Instead of measuring the reception phases for all target angles in advance, it is also possible to calculate the ideal vector of phase values, according to the above-cited formula.

Figure 4:
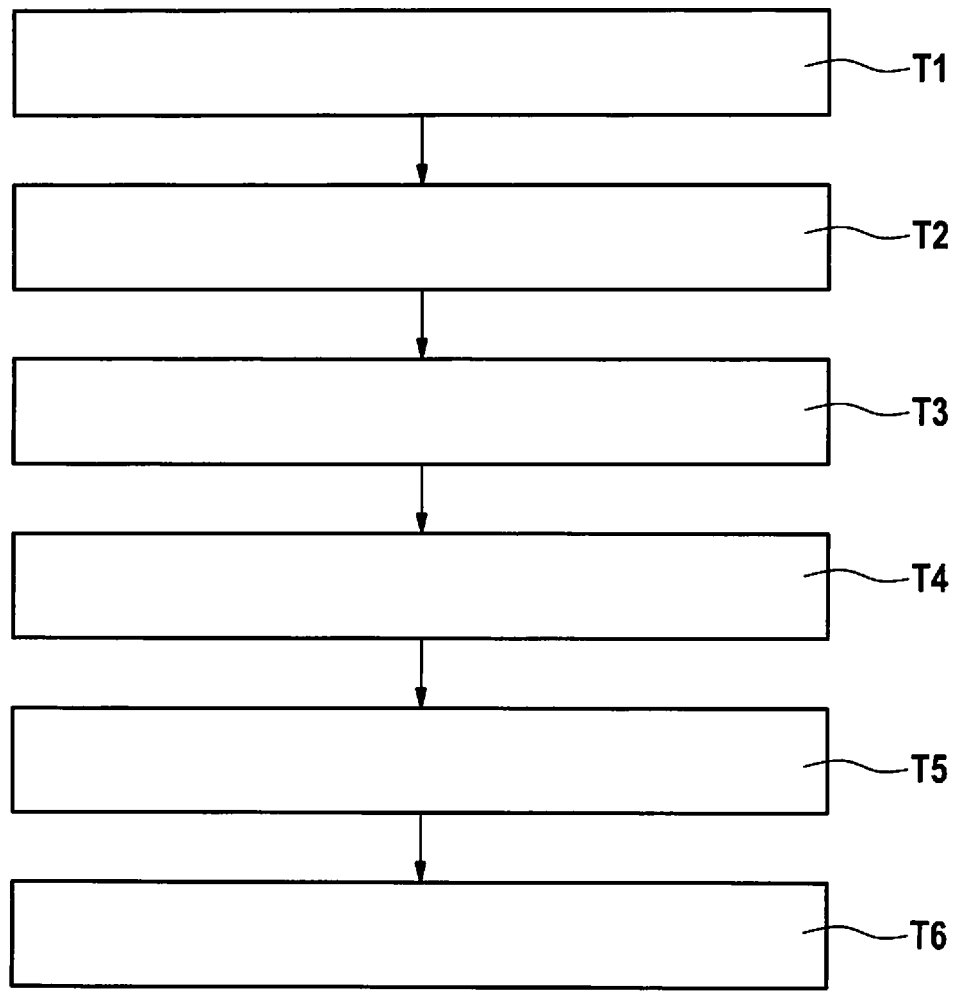
FIG. 4 shows a method according to an example embodiment of the present invention.

FIG. 4 shows a method according to an example embodiment of the present invention. In detail, FIG. 4 is a flowchart for the procedure for verifying a possible object. In a first step T1, light is emitted at an angle X using optical phased array 2. In a second step T2, light is then received from a possible object. In a third step T3, the possible object is identified as a maximum at a particular distance in the spectrum averaged across optical sub-phased arrays 31, . . . , 38, and the corresponding target frequency is established. In a fourth step T4, the respective complex amplitudes in the frequency spectrum are then measured for each optical phased sub-array 31, . . . , 38 at the ascertained target frequency. In a fifth step T5, the measured amplitudes are multiplied with existing amplitudes from a previous measurement, in particular taken from a database in device 1, and an angular spectrum is thus obtained. In a sixth step T6, it is then verified whether the maximum of the angular spectrum is present at angle X. If this is the case, this is considered to be a real target or object, and if not, the next maximum is ascertained in the averaged spectrum according to step T3.

Figure 5:
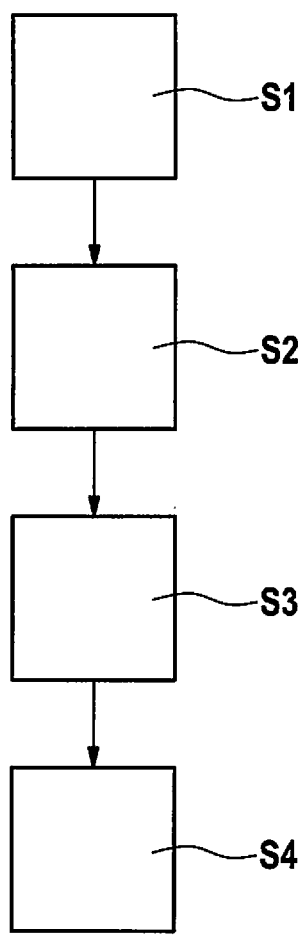
FIG. 5 shows a method according to an example embodiment of the present invention.

FIG. 5 shows a method according to an example embodiment of the present invention. FIG. 5 shows steps of a method for detecting an object using light having at least one wavelength. In a first step S1, light having at least one wavelength is emitted at a particular angle 10. In a further step S2, light is received using an optical phased array including a plurality of optical phased sub-arrays. In a further step S3, at least one possible object is determined based on the received light. In a further step S4, an object is verified based on angle 10 at which the possible object is detected.

In summary, at least one of the example embodiments of the present invention has at least one of the following advantages: reducing false positive targets; easy implementation; and high reliability.

Although the present invention has been described based on preferred example embodiments, it is not limited thereto, but is modifiable in a variety of ways.

What is claimed is:

1. A device for receiving light having at least one wavelength for the detection of an object, comprising:
   an optical phased array that includes a plurality of optical phased sub-arrays, each of the optical phased sub-arrays including: a plurality of antennas, and a detector for coherently receiving light; and
   an evaluation unit, which is connected to the optical phased sub-arrays, to determine an angle at which the object is detected based on the received light;
   wherein the light has the at least one wavelength at a particular angle,
   wherein the object is verified based on the angle at which the possible object is detected, and
   wherein, for the determining of the at least one possible object, a frequency is ascertained at a maximum of a magnitude of a recorded spectrum of the received light, and averaged across the optical phased sub-arrays.

2. The device of claim 1, wherein at least one of central positions of the optical phased sub-arrays is situated asymmetrically in the respective optical phased sub-array.

3. The device of claim 1, wherein at least one of central positions of the optical phased sub-arrays is situated asymmetrically in the respective optical phased sub-array.

4. The device of claim 1, wherein the evaluation unit includes at least one analog-to-digital converter and a processor.

5. A method for detecting an object using light having at least one wavelength, the method comprising:
   emitting light having at least one wavelength at a particular angle;
   receiving light using an optical phased array that includes a plurality of optical phased sub-arrays, each of the optical phased sub-arrays including: a plurality of antennas; and a detector for coherently receiving light;
   determining at least one possible object based on the received light; and
   verifying an object based on the angle at which the possible object is detected;
   wherein, for the determining of the at least one possible object, a frequency is ascertained at a maximum of a magnitude of a recorded spectrum of the received light, and averaged across the optical phased sub-arrays.

6. The method of claim 5, further comprising:
   providing an angular spectrum by each of the optical phased sub-arrays measuring amplitudes in the frequency spectrum at the ascertained frequency; and
   linking the amplitudes with previously measured values.

7. The method of claim 6, wherein the linking is a multiplication.

8. The method of claim 5, further comprising:
   responsive to the verification being unsuccessful, determining a frequency at a further maximum of the recorded spectrum of the received light, averaged across the optical phased sub-arrays.

9. The method of claim 5, wherein the verifying includes checking whether a maximum of an angular spectrum exists at the determined angle.

10. A LIDAR system, comprising:
    a device for receiving light having at least one wavelength for the detection of an object, including:
      an optical phased array that includes a plurality of optical phased sub-arrays, each of the optical phased sub-arrays including: a plurality of antennas, and a detector for coherently receiving light; and
      an evaluation unit, which is connected to the optical phased sub-arrays, to determine an angle at which the object is detected based on the received light;
    wherein the light has the at least one wavelength at a particular angle,
    wherein the object is verified based on the angle at which the possible object is detected, and
    wherein, for the determining of the at least one possible object, a frequency is ascertained at a maximum of a magnitude of a recorded spectrum of the received light, and averaged across the optical phased sub-arrays.

11. The LIDAR system of claim 8, wherein the LIDAR system is a frequency-modulated continuous wave LIDAR system.

* * * * *